(12) United States Patent
Yin

(10) Patent No.: US 11,570,610 B2
(45) Date of Patent: Jan. 31, 2023

(54) SYSTEM AND METHOD FOR MANAGING VISITOR LOCATION REGISTER (VLR) RECORDS BY UPDATING DUPLICATE RECORDS

(71) Applicant: TELUS Communications Inc., Vancouver (CA)

(72) Inventor: Zhengyun (Michael) Yin, Markham (CA)

(73) Assignee: TELUS Communications Inc., Vancouver (CA)

( * ) Notice: Subject to any disclaimer, the term of this patent is extended or adjusted under 35 U.S.C. 154(b) by 198 days.

(21) Appl. No.: 16/861,909

(22) Filed: Apr. 29, 2020

(65) Prior Publication Data
US 2021/0314761 A1    Oct. 7, 2021

(30) Foreign Application Priority Data

Apr. 3, 2020    (CA) ..................................... 3077838

(51) Int. Cl.
| | | |
|---|---|---|
| *H04W 8/06* | (2009.01) | |
| *H04W 8/04* | (2009.01) | |
| *H04W 8/18* | (2009.01) | |
| *H04L 101/654* | (2022.01) | |

(52) U.S. Cl.
CPC .............. *H04W 8/06* (2013.01); *H04W 8/04* (2013.01); *H04W 8/183* (2013.01); *H04L 2101/654* (2022.05)

(58) Field of Classification Search
CPC ......... H04W 8/06; H04W 8/04; H04W 8/183; H04W 8/30; H04L 61/6054
See application file for complete search history.

(56) References Cited

U.S. PATENT DOCUMENTS 5,490,201 A     2/1996   Moberg et al.
5,819,178 A  * 10/1998   Cropper .................. H04W 8/02
                                                    455/433

(Continued)

FOREIGN PATENT DOCUMENTS

| CN | 101640872 B | 5/2012 |
| EP | 1 472 809 B1 | 3/2011 |
| WO | 2008/033951 A2 | 3/2008 |

*Primary Examiner* — Ayaz R Sheikh
*Assistant Examiner* — Tarell A Hampton
(74) *Attorney, Agent, or Firm* — Seed Intellectual Property Law Group LLP

(57) ABSTRACT

There is a method and system of removing duplicate Visitor Location Register (VLR) records, and updating the VLR's Global Title Address (GTA) in their Home Location Register (HLR) to avoid duplicate VLR impact to customer service, which may result in missed inbound calls and delayed inbound SMS. Duplicate VLR GTA means that one subscriber has more than one VLR record in different Mobile Switching Stations (MSS) or Mobile Switching Centers (MSC). The valid VLR is identified by comparing the "last active timestamp" of the same subscriber identity (IMSI, or MSISDN, or MDN) of VLR records obtained from each MSS/MSC. The VLR that has the most recent "last active timestamp" is used to identify the active/valid VLR which serves the subscriber. Afterwards the non-active VLR records will be deleted, and the VLR's GTA in HLR will be updated as needed.

27 Claims, 5 Drawing Sheets

(56) References Cited

U.S. PATENT DOCUMENTS

| | | | | |
|---|---|---|---|---|
| 5,953,652 | A * | 9/1999 | Amin | H04W 12/126 455/410 |
| 5,978,678 | A * | 11/1999 | Houde | H04W 8/12 455/433 |
| 6,021,327 | A * | 2/2000 | Nguyen | H04W 8/06 455/433 |
| 6,091,952 | A | 7/2000 | Xu et al. | |
| 6,370,373 | B1 * | 4/2002 | Gerth | H04M 15/47 455/410 |
| 6,418,212 | B1 * | 7/2002 | Harrison | H04M 15/00 379/189 |
| 6,466,777 | B1 * | 10/2002 | Urita | H04W 12/126 455/410 |
| 6,587,688 | B1 * | 7/2003 | Chambers | H04W 8/12 455/433 |
| 6,731,932 | B1 | 5/2004 | Rune et al. | |
| 8,380,165 | B1 * | 2/2013 | Koller | H04M 1/66 709/224 |
| 2001/0044295 | A1 * | 11/2001 | Saito | H04M 1/67 455/410 |
| 2001/0053684 | A1 * | 12/2001 | Pirila | H04W 12/126 455/410 |
| 2003/0101357 | A1 * | 5/2003 | Ronen | H04L 63/1416 709/224 |
| 2003/0135676 | A1 * | 7/2003 | Jensen | G06F 1/3237 710/107 |
| 2004/0038666 | A1 * | 2/2004 | Lohtaja | H04W 12/126 455/410 |
| 2005/0282529 | A1 * | 12/2005 | Thorson | H04M 3/16 455/410 |
| 2006/0009195 | A1 * | 1/2006 | Itoh | H04W 12/126 455/410 |
| 2007/0275718 | A1 * | 11/2007 | Descombes | H04M 15/47 455/435.1 |
| 2008/0259966 | A1 * | 10/2008 | Baird | H04N 21/43079 370/503 |
| 2015/0373773 | A1 * | 12/2015 | Ainali | H04L 63/306 455/411 |
| 2018/0098216 | A1 * | 4/2018 | Vincent | H04W 12/06 |

* cited by examiner

SYSTEM AND METHOD FOR MANAGING VISITOR LOCATION REGISTER (VLR) RECORDS BY UPDATING DUPLICATE RECORDS

BACKGROUND

Technical Field

The disclosed systems and methods relate to managing visitor location register (VLR) records by removing duplicate records.

Description of the Related Art

There is a long-existing challenge for wireless operators in synchronizing subscriber's profiles within a telecommunication system's location register database infrastructure. A Visitor Location Register (VLR) is a database that stores the mobile stations that are in the area of a mobile switching station and base station in the network. A VLR may be stored at a mobile switching station or an equivalent server, such as one of an MSS and an MSC. A cellular service subscriber is represented in the network by a VLR record. However, an error condition within the network can cause a single subscriber to have more than one VLR record simultaneously. This condition is called duplicate VLR.

Duplicate VLR conditions can cause serious disruption for subscribers. When duplicate VLR records exist, a subscriber appears to be registered in more than one Mobile Switching Station (MSS) or Mobile Switching Center (MSC). Further, the Home Location Register (HLR) could be pointing to the wrong Global Title Address (GTA) of the serving VLR and therefore be pointing to the wrong MSS/MSC. When that happens, incoming calls to the subscriber may fail to cause the device to ring. The calls may be sent straight to voicemail if applicable, or just fail when no voice mail is assigned to the affected subscriber. Incoming text messages are not delivered to the customer but are buffered in the Message Center or Message Gateway.

There are drawbacks with current attempts to solve these issues. In order to attempt to resolve duplicate VLR, some operators use a HLR Mobile Application Part (MAP) Reset to force the MSS or MSC to send an update location message to the HLR when the subscriber device sends an update location message to the MSS/MSC, so that the HLR can update the VLR's GTA. This procedure is typically supported by HLR and MSS/MSC nodes as described in 3GPP, 3GPP2 or GSM specifications. However, this procedure is highly intrusive in terms of network signaling. It causes very high network load for an extended period of time. These procedures can take hours to execute in a large network.

BRIEF SUMMARY

There is provided in one embodiment a method and system of removing/deleting duplicate Visitor Location Register (VLR) records and updating the Global Title Address (GTA) for the duplicate VLR records in their corresponding Home Location Register (HLR) records to avoid duplicate VLR impact to customer service. When comparing duplicate VLR records, the valid VLR record is identified by comparing the "last active timestamp" of the same subscriber identity, such as IMSI, or MSISDN, or MDN, from VLR records obtained from each Mobile Switching Stations (MSSs) or Mobile Switching Centers (MSCs). The VLR that has the most recent "last active timestamp" is used to identify the active/valid VLR which serves the subscriber. Afterwards the non-active VLR records will be deleted, and the active VLR's GTA in the HLR will be updated as needed.

There is provided in one embodiment a method of managing a plurality of Visitor Location Registers (VLRs) in a telecommunication system. Each of the plurality of VLRs have VLR records. Each of the VLR records are associated with a subscriber identity of a plurality of subscriber identities. VLR subscriber data is obtained from the plurality of VLRs. The obtained VLR subscriber data includes a list of subscriber identities obtained from the VLR records of the plurality of VLRs. Suspect VLR records are identified from the obtained VLR subscriber data by identifying instances in which one or more of the subscriber identities is associated with more than one record in the plurality of VLRs. Timestamp information is obtained from the plurality of VLRs corresponding to each of the suspect VLR records. For each subscriber identity associated with the suspect VLR records an active VLR record and one or more non-active VLR records associated with the subscriber identity is determined based on the obtained timestamp information. Instructions are sent to the VLRs having non-active VLR records to delete the one or more non-active VLR records for each subscriber identity.

In various embodiments, there may be included any one or more of the following features of the method: converting the timestamp information for each of the suspect VLR records into a common reference time; each of the subscriber identities comprise one of International Mobile Subscriber Identity (IMSI), Mobile Station International Subscriber Directory Number (MSISDN) or Mobile Directory Number (MDN); sending instructions to update Home Location Register (HLR) records in a home subscriber's HLR, in which each of the HLR records in the HLR is associated with one of the plurality of subscriber identities and a corresponding VLR Global Title Address (GTA) associated with the subscriber identity, and further comprising, for each of the subscriber identities associated with the suspect VLR records, sending instructions to the home subscriber's HLR to update the VLR GTA to point to the VLR associated with the active VLR record, comparing the VLR GTA in the HLR records associated with each subscriber identity of the suspect VLR records with the VLR associated with the active VLR record, and sending instructions to update the HLR record if the VLR GTA for the subscriber identity in the HLR is not the active VLR record; and each of the VLRs are stored at one of a Mobile Switching Station (MSS) and a Mobile Switching Center (MSC), and in which sending instructions to delete the one or more non-active VLR records for each subscriber identity further comprises sending instructions to each of the MSSs or MSCs simultaneously.

There is provided in one embodiment a system for managing a plurality of Visitor Location Registers (VLRs) in a telecommunication system. Each of the plurality of VLRs have VLR records. Each of the VLR records associated with a subscriber identity of a plurality of subscriber identities. The system comprises a server including a processor and a database. The server is configured to obtain VLR subscriber data from the plurality of VLRs. The obtained VLR subscriber data includes a list of subscriber identities obtained from the VLR records of the plurality of VLRs. The server is configured to store the VLR subscriber data in the database. The server is configured to identify suspect VLR records from the obtained VLR subscriber data by identifying instances in which one or more of the subscriber identities is associated with more than one record in the plurality of VLRs. The server is configured to obtain timestamp information from the plurality of VLRs corresponding to each of the suspect VLR records. The server is configured to determine for each subscriber identity associated with the suspect VLR records an active VLR record and one or more non-active VLR records associated with the subscriber identity based on the obtained timestamp information. The server is configured to send instructions to the VLRs having non-active VLR records to delete the one or more non-active VLR records for each subscriber identity.

In various embodiments, there may be included any one or more of the following features of the system: the server is further configured to convert the timestamp information for each of the suspect VLR records into a common reference time; each of the subscriber identities comprise one of International Mobile Subscriber Identity (IMSI), Mobile Station International Subscriber Directory Number (MSISDN) or Mobile Directory Number (MDN); the server is further configured to send instructions to update Home Location Register (HLR) records in a home subscriber's HLR, in which each of the HLR records in the HLR is associated with one of the plurality of subscriber identities and a corresponding VLR GTA associated with the subscriber identity, and to store the HLR data in the database, and in which for each of the subscriber identities associated with the suspect VLR records, the instructions are sent to the home subscriber's HLR to update the VLR GTA to point to the VLR associated with the active VLR record, the server is further configured to compare the VLR GTA in the HLR records associated with each subscriber identity of the suspect VLR records with the VLR associated with the active VLR record, and to send instructions to update the HLR record for the subscriber identity if the VLR GTA for the subscriber identity in the HLR does not point to the VLR associated with the active VLR record; and each of the VLRs are stored at one of a Mobile Switching Station (MSS) and a Mobile Switching Center (MSC), and in which the server is configured to send instructions to each of the MSSs or MSCs simultaneously when the server sends instructions to delete the one or more non-active VLR records.

There is provided in one embodiment a method of managing non-active Visitor Location Register (VLR) records from a plurality of VLRs in a telecommunication system. Each of the plurality of VLRs have VLR records. Each of the VLR records are associated with a subscriber identity of a plurality of subscriber identities. VLR timestamp data associated with a subset of the plurality of subscriber identities is obtained from the plurality of VLRs. The VLR timestamp data includes timestamp information from the plurality of VLRs corresponding to each subscriber identity of the subset of the plurality of subscriber identities. For each subscriber identity of the subset of subscriber identities, an active VLR record and one or more non-active VLR records is determined based on the VLR timestamp data. Instructions are sent to each of the VLR records storing non-active VLR records to delete the one or more non-active VLR records associated with each subscriber identity of the subset of subscriber identities.

In various embodiments, there may be included any one or more of the following features of the method: the subset of subscriber identities is derived from a list of subscriber identities associated with users having network connectivity issues; the subset of subscriber identities is obtained by obtaining VLR subscriber data from the plurality of VLRs, the VLR subscriber data including a list of subscriber identities obtained from the VLR records of the plurality of VLRs and the subset of subscriber identities is obtained from the obtained VLR subscriber data by identifying instances in which one or more of the subscriber identities is associated with more than one record in the plurality of VLRs; the VLR timestamp data is obtained from the plurality of VLRs based on simultaneous requests sent to each of the plurality of VLRs for timestamp information from the VLR records corresponding to each subscriber identity of the subset of the plurality of subscriber identities; converting the timestamp information in the VLR timestamp data into a common reference time prior to determining the active and the one or more non-active VLR records; each of the subscriber identities comprise one of International Mobile Subscriber Identity (IMSI), Mobile Station International Subscriber Directory Number (MSISDN) or Mobile Directory Number (MDN); and obtaining Home Location Register (HLR) data associated with the subset of subscriber identities from one or more HLRs having HLR records, and in which the HLR records have a corresponding VLR Global Title Address (GTA) associated with each of the subscriber identities of the subset of subscriber identities, and sending instructions, for each subscriber identity of the subset of subscriber identities associated with the one or more non-active VLR records, to a home subscriber's HLR to update the VLR GTA to point to the VLR associated with the active VLR record for the subscriber identity, and the HLR data includes the VLR GTA associated with each subscriber identity of the subset of subscriber identities, and comparing the VLR GTA for each of the subscriber identities of the subset of subscriber identities with the VLR associated with the active VLR record, and sending instructions to the home subscriber's HLR to update the HLR record if the VLR GTA for the subscriber identity in the HLR data is associated with a VLR record identified as non-active.

There is provided in one embodiment a system for managing non-active Visitor Location Register (VLR) records from a plurality of VLRs in a telecommunication system. Each of the plurality of VLRs having VLR records. Each of the VLR records being associated with a subscriber identity of a plurality of subscriber identities. The system comprising a server including a processor and a database. The server being configured to obtain VLR timestamp data associated with a subset of the plurality of subscriber identities from the plurality of VLRs. The VLR timestamp data including timestamp information from the plurality of VLRs corresponding to each subscriber identity of the subset of the plurality of subscriber identities. The server being configured to store the VLR timestamp data in the database. The server being configured to determine, for each subscriber identity of the subset of subscriber identities, active and non-active VLR records based on the VLR timestamp data. The server being configured to send instructions to each of the plurality of VLRs storing non-active VLR records to delete the non-active VLR records associated with each subscriber identity of the subset of subscriber identities.

In various embodiments, there may be included any one or more of the following features of the system: the server is further configured to obtain VLR subscriber data from the plurality of VLRs, the VLR subscriber data including a list of subscriber identities obtained from the VLR records of the plurality of VLRs, the server is further configured to store the VLR subscriber data in the database, and the server is further configured to identify the subset of subscriber identities from the obtained VLR subscriber data by identifying instances in which one or more of the subscriber identities is associated with more than one record in the plurality of VLRs; the server is further configured to convert the timestamp information from the VLR timestamp data into a common reference time; each of the subscriber identities comprise one of International Mobile Subscriber Identity (IMSI), Mobile Station International Subscriber Directory Number (MSISDN) or Mobile Directory Number (MDN); the server is further configured to obtain Home Location Register (HLR) data associated with the subset of subscriber identities from one or more HLRs having HLR records and in which the HLR records have a corresponding VLR Global Title Address (GTA) associated with each of the subscriber identities of the subset of subscriber identities and to store the HLR data in the database, and the server is further configured to, for each subscriber identity of the subset of subscriber identities associated with non-active VLR records, send instructions to a home subscriber's HLR to update the VLR GTA to point to the VLR associated with the active VLR record for the subscriber identity, the HLR data includes the VLR GTA associated with each subscriber identity of the subset of subscriber identities, and the system is further configured to comparing the VLR GTA for each of the subscriber identities of the subset of subscriber identities with the VLR associated with the active VLR record, and to send instructions to the home subscriber's HLR to update the HLR record if the VLR GTA for the subscriber identity in the HLR data does not point to the VLR associated with the active VLR record; and each of the VLRs are stored at one of a Mobile Switching Station (MSS) and a Mobile Switching Center (MSC), and in which the server is configured to send instructions to each of the MSSs or MSCs simultaneously when the server sends instructions to delete the one or more non-active VLR records.

These and other aspects of the system and method are set out in the claims, which are incorporated here by reference.

BRIEF DESCRIPTION OF THE SEVERAL VIEWS OF THE DRAWINGS

Embodiments will now be described with reference to the figures, in which like reference characters denote like elements, by way of example, and in which.

DETAILED DESCRIPTION

In an embodiment there is disclosed a system and method of identifying which Visitor Location Register (VLR) record is valid when multiple VLR records for a single subscriber exist. The system and method avoid false positives when identifying the list of impacted subscribers which have duplicate VLR. Duplicative VLR records are proactively corrected with minimum network impact and to avoid customer impact. The system and method will identify which VLR record is the active one serving the subscriber and will delete the old VLR record(s) which is (are) not serving the subscriber and keep the active VLR record which is serving the subscriber. The Global Title Address in the HLR that corresponds with the active VLR record is updated so that the HLR can point to the active VLR.

In an embodiment there is a system and method which may accurately identify duplicate VLR records for massive numbers of subscribers and identify which VLR record is valid and active when duplicate VLR records exist. The system and method can solve the duplicate VLR problem effectively and quickly, without depending on customer behavior, and without generating any significant network signaling load. The system and method synchronize the databases between different VLRs and between the HLR and the VLR with an active record. The main algorithm is to identify the active VLR records by comparing VLR timestamps between duplicated VLR records in a Mobile Switching Station (MSS) or Mobile Switching Center (MSC), and then update the subscriber's HLR record with the correct VLR GTA. The function of this solution is to attempt to improve a subscriber's quality of service through improving call connection rate.

In an embodiment there is a system and method of identifying an active VLR record which serves the mobile subscriber when duplicate VLR records exist. The system and method updates/corrects the active VLR's GTA in the HLR by comparing the subscriber's GTA in use in the HLR to the GTA for the VLR of the active VLR record when duplicate VLR records exist. Non-active VLR records are deleted when duplicate VLR records exist. The system and method search for and identify duplicate VLR records network-wide simultaneously in order to minimize the probability of false duplicates. The method may accurately identify active VLR records which serve the customer and quickly eliminate the error condition from the network, preventing service impact to the affected subscriber. Hence the system and method may help wireless operators to improve their service level. Some embodiments of the system and method may be coded in order to run quickly and efficiently in a central server/computer, with high levels of program tuning and optimization. The system and method are intended to minimize customer complaints by proactively finding and solving error conditions within the network caused by duplicate VLR records.

Figure 1:
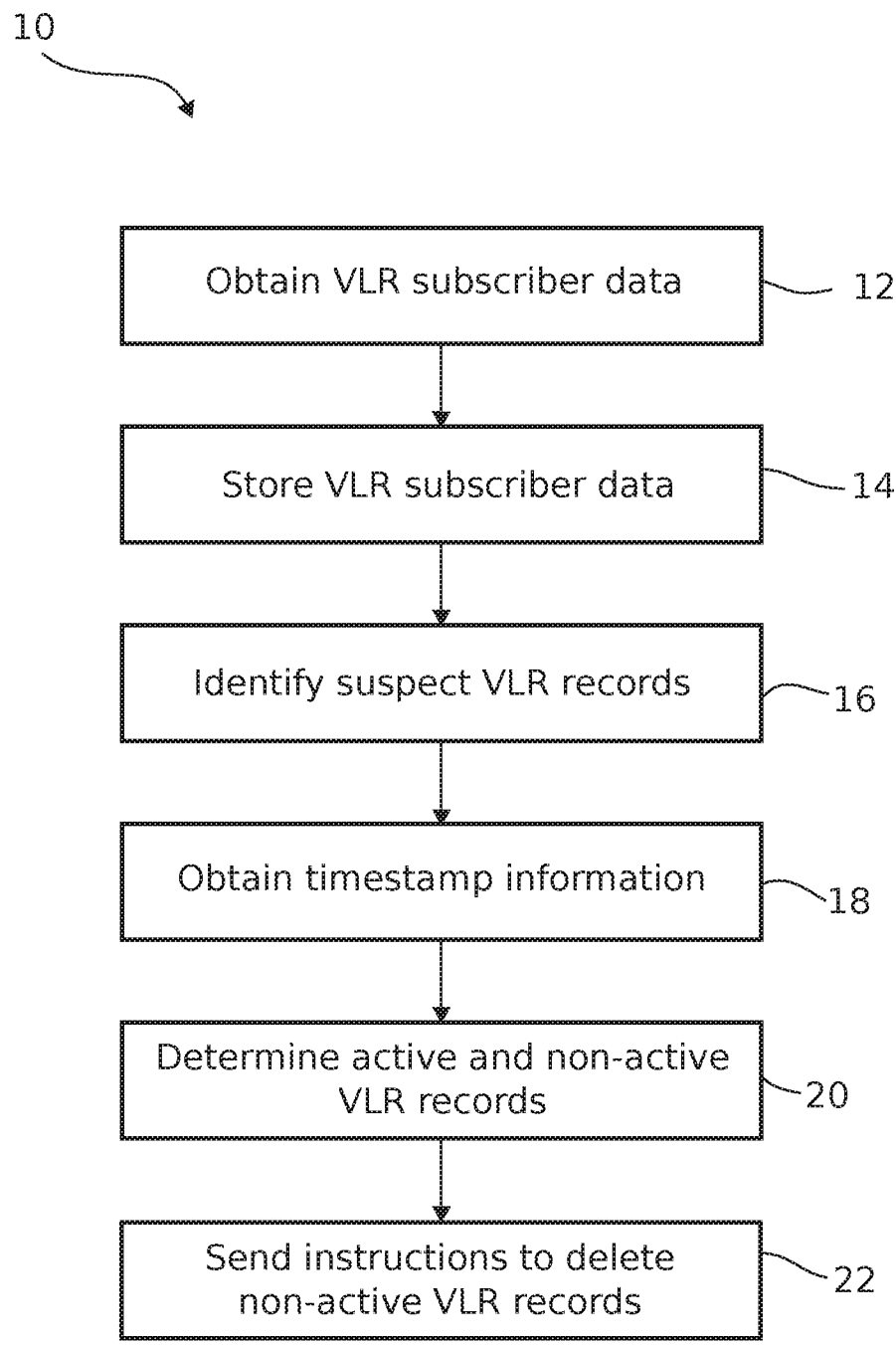
FIG. 1 is a flow diagram of an embodiment of a method of managing a plurality of VLRs in a telecommunication system.

In an embodiment shown in FIG. 1 there is a method 10 of managing a plurality of VLRs in a telecommunication system. The method allows for non-active duplicate VLR records to be deleted and will allow for a home subscriber's VLR GTA in HLR to be updated, if necessary. A duplicate VLR record exists if a subscriber has more than one VLR record in different Mobile Switching Stations (MSSs) or Mobile Switching Centers (MSCs).

Each of the plurality of VLRs have VLR records, each of the VLR records are associated with a subscriber identity of a plurality of subscriber identities. The subscriber identity may be one of an International Mobile Subscriber Identity (IMSI), Mobile Station International Subscriber Directory Number (MSISDN) or Mobile Directory Number (MDN) etc. The subscriber identity may be any identifier that is unique to each subscriber.

At 12, VLR subscriber data is obtained from the plurality of VLRs. The VLR subscriber data obtained from the plurality of VLRs may include at least a list of subscriber identities obtained from the VLR records of the plurality of VLRs. The VLR subscriber data may include a list of subscriber identities for each VLR and include information by which the method can identify which of the list of subscribers was obtained from which of the VLRs. The VLR subscriber data may be a complete list or subset of all of the data stored in the VLR records from each of the VLRs with some process to allow the method to identify which VLR records were obtained from which VLRs. The information that is acquired and stored as part of the VLR subscriber data can be chosen based on the specific needs of the user. The information stored with the VLR subscriber data must be sufficiently detailed to allow the system and method to identify that a particular subscriber has at least one VLR record stored in at least two separate VLRs.

Each of the VLRs may be stored at a mobile switching station or an equivalent server, such as one of an MSS and an MSC. At 14, once the VLR subscriber data is obtained, the VLR subscriber data may be transferred to and stored in a database on a computer server, such as database 28 (FIG. 2) where it may be analyzed further. At 16, suspect VLR records are identified from the obtained VLR subscriber data by identifying instances in which one or more of the subscriber identities is associated with more than one record in the plurality of VLRs.

At 18, timestamp information from the plurality of VLRs corresponding to each of the suspect VLR records is obtained. The obtained timestamp information may be stored as VLR timestamp data. Preferably, the timestamp information is obtained using a separate query after suspect VLR records have been identified by requesting timestamp information only from VLR records that are identified as suspect. It is preferable for the timestamp information to be obtained as close as possible to the assessment of which is the active VLR record, so that no errors are created due to the passage of time. Preferably, the requests for timestamp information from the VLRs should be made at or near simultaneously so that no changes are made to the VLR records during the time that timestamp information is obtained.

If the VLR records do not share a common reference time, the time stamp of each VLR records needs be normalized in the central server/computer to make the time stamp information comparable. Variations in time may, for example, be caused by different time zones, daylight savings time versus standard time and missing year information. The VLR timestamp in different MSSs/MSCs may have different local time zones. The timestamp information from the plurality of VLRs further may be converted into a common reference time prior to comparing the timestamp information between VLR records. The server 24 (FIG. 2) may convert all VLRs timestamp to a common reference time, such as Coordinated Universal Time (UTC). The server 24 may also need to convert times between daylight savings time/summer time and standard time/winter time if those times are implemented in the MSSs/MSCs. The timestamp information from the plurality of VLRs may need consider the summer time or winter time when normalizing the timestamp information. The timestamp from the plurality of VLRs may include month/day/hour/minute or month/day/hour/minute/second, but may not include year information. The central server/computer may adjust VLR record time in the timestamp information to account for the lack of year information by using the computer current time get from the computer server and comparing the time stored in the central server with the VLR record time in the timestamp for that VLR. If the VLR timestamp timer refers to a time within the year that is in the future compared to the computer time, the system will add the previous year as the year in the VLR record timestamp. That is, the year of the VLR record timestamp is recorded as being the year one less than the current year of the central computer time. If the VLR timestamp timer is a time within the year that is equal to or earlier than the current computer time, the year of the central computer time is added as the year of the VLR record timestamp.

When one subscriber has more than one VLR record during the 'all VLR records' dump, those records are classified as 'suspect' duplicates. Obtaining VLR subscriber data during step 12 may take time to obtain from potentially millions of VLR records. It may take as long as 40 minutes or more to finish all of the VLR records dumps from each MSS/MSC, depending on the total number of subscribers. One subscriber may switch registration from one serving VLR to another serving VLR normally during the downloading process.

During the time in which the VLR subscriber data is obtained, certain subscribers may be incorrectly identified as suspect because they may have moved from being listed in one VLR to another during the time in which the VLR subscriber data is obtained. Both records from a particular subscriber may have existed in two or more VLRs during the process of obtaining VLR records for massive subscribers, despite there being no actual duplication of records. The older record may have been obtained from the VLR early in the records dump process and then deleted after the record had been obtained but before the records dump was complete. The new VLR record may then have been obtained as the records dump process continued from a different VLR because the new VLR record was created while the record dump process was continuing. Steps may be taken to remove incorrectly identified suspect VLR records from the list of suspect records. Alternatively, incorrectly identified suspect VLR records may be treated by the server as if they are still present, since requests to delete the older VLR records will not result in deleted records, since those records would no longer be stored in the corresponding VLR(s).

In cases where it is not possible to identify which VLR record is the active one, for example, if two separate timestamps are identical up to the minute and the timestamp information is only pinpointed to the nearest minute, then both VLR records are kept and no changes are made.

A server 24 (FIG. 2) may maintain a list of the suspect VLR records. The method may remove VLR records from the list of suspect VLR records for which the suspect VLR records have been updated resulting in the one or more subscriber identities no longer being associated with more than one record in the plurality of VLRs.

At 20, for each subscriber identity associated with the suspect VLR records an active VLR record and one or more non-active VLR records associated with the subscriber identity is determined based on the obtained timestamp information. The server aligns all VLR records coming from all MSS/MSC and identifies the active records for all duplicates based on the "last active timestamp." The VLR records for a subscriber which has the latest "last active timestamp" is identified as an active VLR. The VLR record for that subscriber which has older "last active timestamp" is identified as non-active VLR or old VLR.

At 22, instructions are sent to the VLRs having non-active VLR records to delete the one or more non-active VLR records for each subscriber identity. The respective MSSs/MSCs will delete the non-active duplicate VLR records. Update instructions need only be sent to VLRs with non-active VLR records.

In addition to sending instructions to delete the non-active VLR records, the method may send instructions to update records in a Home Location Register (HLR). Each of the HLR records in the HLR is associated with one of the plurality of subscriber identities (IMSI, or MSISDN, or MDN, etc.) and corresponding routing information, such as a Global Title Address (GTA) of the VLR, associated with the subscriber identity. For each of the subscriber identities associated with the suspect VLR records, instructions are sent to the home subscriber's HLR to update the VLR GTA to point to the VLR associated with the active VLR record.

Instructions to delete the one or more non-active VLR records for each subscriber identity may be sent simultaneously to each of the MSSs or MSCs or other switching stations. The VLR GTA in the HLR records associated with each subscriber identity of the suspect VLR records is compared with the VLR associated with the active VLR record. Instructions to update the HLR record are sent if the VLR GTA for the subscriber identity in the HLR is not the active VLR record. If the VLR associated with the active VLR record is correctly identified in the VLR GTA in the HLR, then no update is required.

Figure 2:
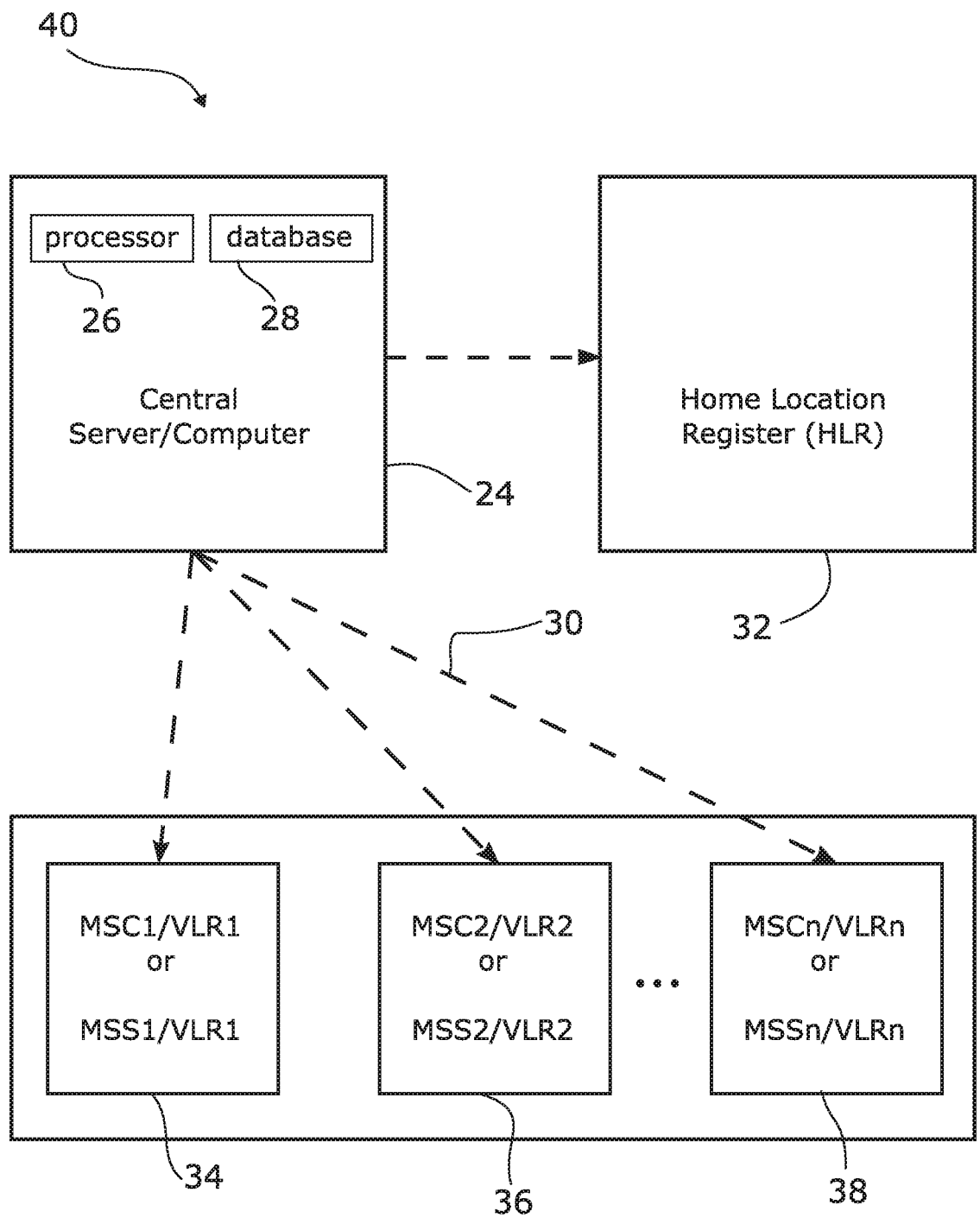
FIG. 2 is a high-level schematic diagram of a central server for managing a plurality of VLRs in a telecommunication system.

FIG. 2 discloses a system 40 for managing a plurality of VLRs in a telecommunication system. There is a server 24 including a processor 26 and a database 28. The server 24 may be configured to implement the methods set out in FIGS. 1, 3, 4 and 5. The server 24 is in communication through a communication link 30 to a plurality of MSCs or MSSs 34, 36, 38 which each include a VLR. The server 24 is also in communication with HLR/HLRs 32.

Figure 3:
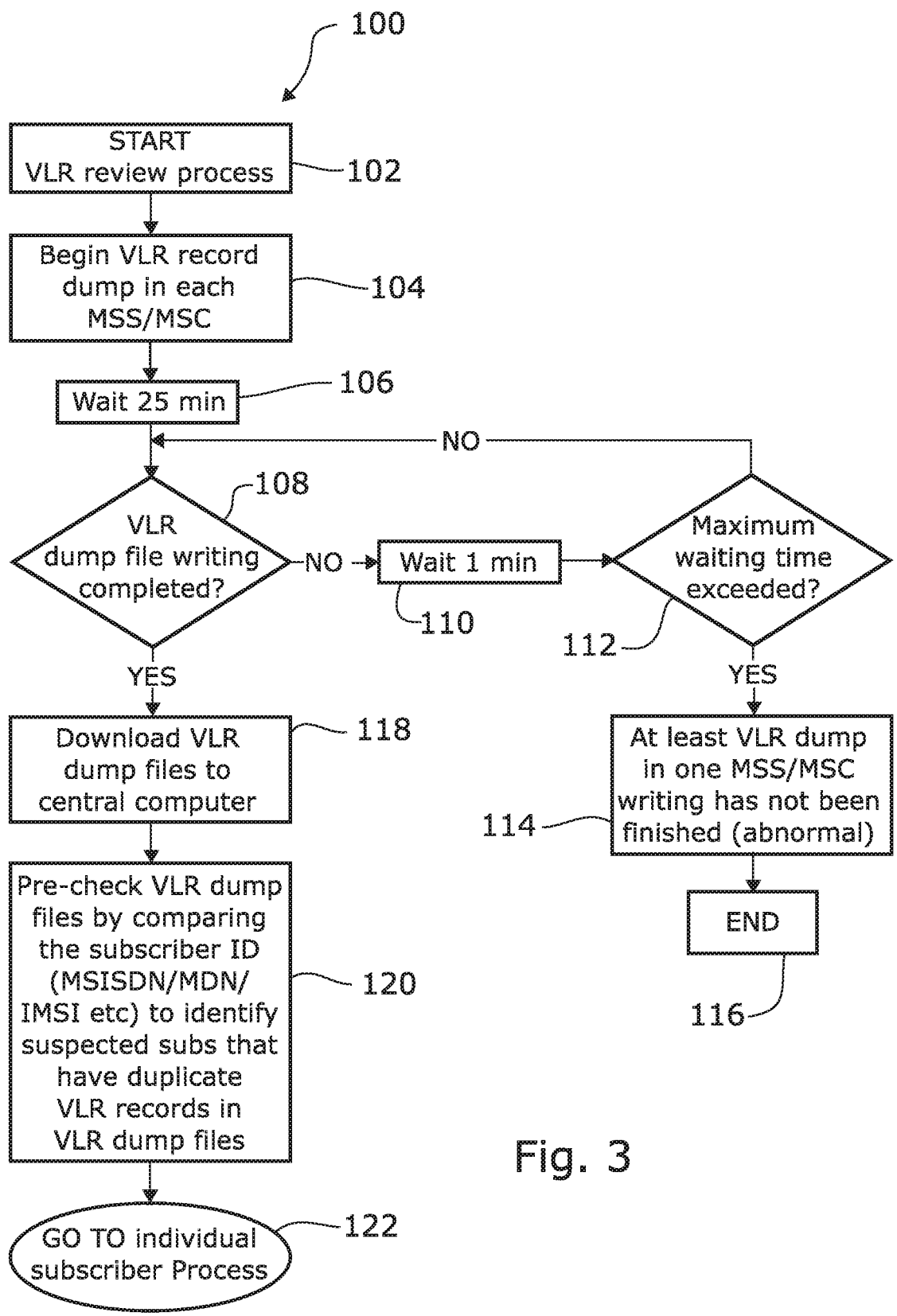
FIG. 3 is a flow diagram of an embodiment of a method of identifying suspect VLR records.
Figure 4:
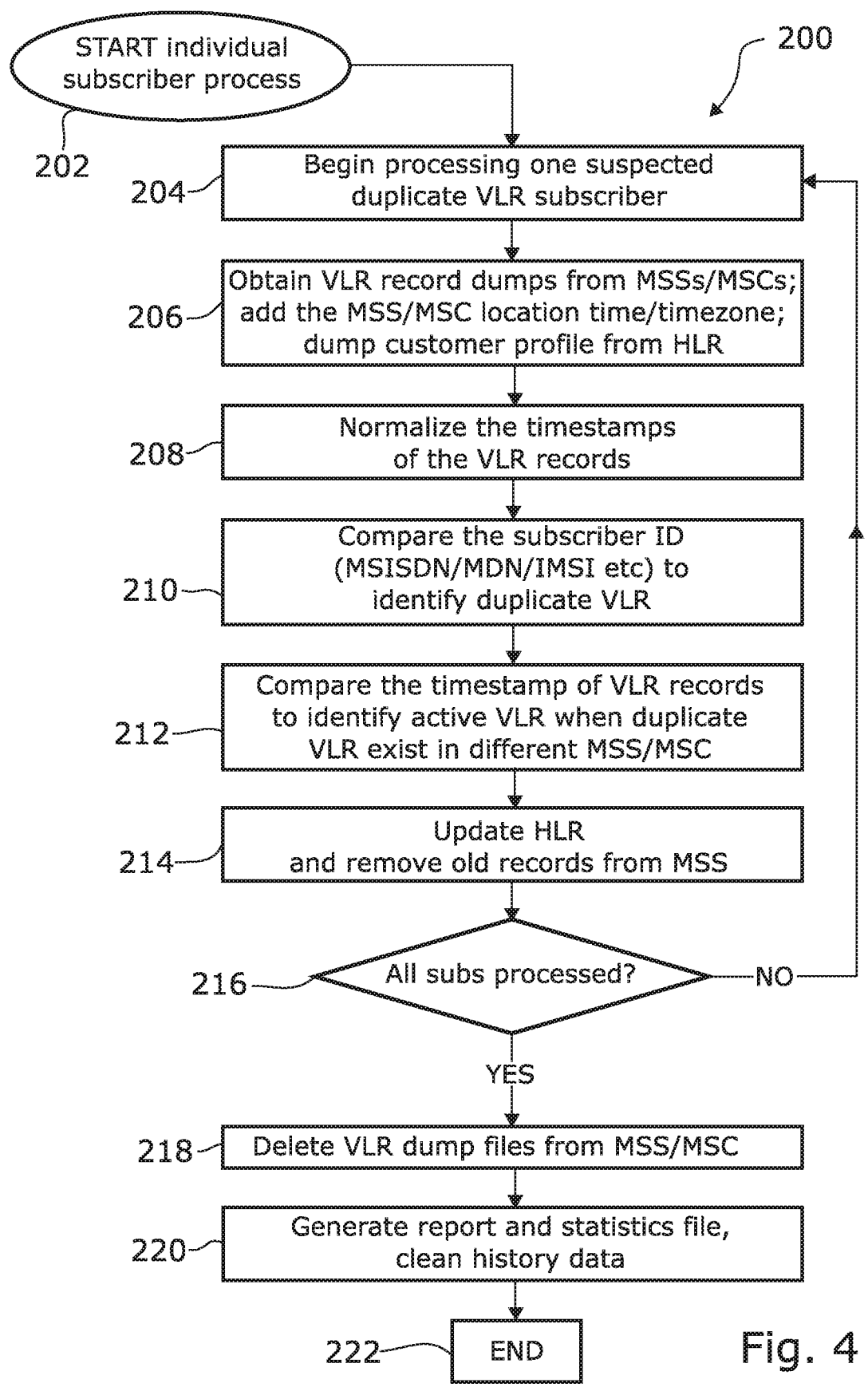
FIG. 4 is a flow diagram of an embodiment of a method of updating VLR records and HLR records for duplicate VLR records.

There is disclosed in FIGS. 3 and 4 an embodiment of a method of searching and identifying duplicate VLR records quickly in two rounds, network-wide in order to minimize the probability of false duplicates. In the first round, as shown in FIG. 3, there is a method 100 of obtaining and comparing all the subscriber VLR records in the network to identify suspect duplicate VLR records. The VLR record reviewing process starts at 102.

The central server 24 (FIG. 2) sends commands at 104 to each MSS or MSC to obtain the VLR records. The server may send the requests simultaneously to each of the MSSs or MSCs to dump all VLR records and save or download the VLR dump files to the database 28 (FIG. 2) of the central server 24.

All records from each MSS/MSC are downloaded into the central database 28 (FIG. 2) at 104. At a set time interval, such as 25 minutes as shown at 106, a review is conducted to determine whether the VLR dump of data from each of the MSCs/MSSs has fully written to the database as shown at 108. This review time could be nominal length of time, or zero, in which case the method will proceed to the wait timer step. If the process has not completed, the process may set another wait time, such as one minute, to determine whether the process has completed as shown at 110. If at 112 a max waiting time has been exceeded, then at least one VLR dump in one MSS/MSC may not have been finished, which is abnormal at 114. In that case, the process may end 116 and an error report may be generated. The process may also be programmed to take steps to determine the cause of the error. The system may identify and report a particular MSS/MSC for which the download of VLR records was delayed so that the error can be reviewed. The length of time the algorithm is allowed to run before reviewing whether the dump is complete may vary. The length of time prior to conducting a review and the length of time to do further queries may be changed depending on the number of records in the various VLRs. The times may be selected based on a determination of the number of records. In some cases, the process may be programmed to detect when each VLR dump is completed without the use of timers.

If the VLR dump writing process is completed at 108, then the downloaded VLR records 118 have been successfully transferred to the files on the server 24 (FIG. 2). A process to identify duplicate VLR records is started at 120. The Central Server/Computer compares VLR records based on the subscriber identity (IMSI, or MSISDN, or MSD) to identify duplicates. The VLR records obtained in the information dump may be compared based on the subscriber ID (MSISDN/MDN/IMSI, etc.) to get suspected subscribers who have duplicate VLR records in the VLR dump files. At this point, at 122, the process moves to the individual subscriber process as shown in FIG. 4.

In the second round of the process as shown in FIG. 4, each suspect VLR record is re-queried again in real time, for verification and, if necessary, deletion of the older records in the MSSs/MSCs, and to update the home subscriber's HLR accordingly. The individual subscriber process 200 starts at 202 in FIG. 4. At 204, a process is run for each suspect duplicate VLR subscriber. The VLR dumps from the MSSs/MSCs are obtained and the MSS/MSC location times/time zones are determined at 206 and added to the VLR dumps. The customer profile is obtained from a dump from the HLR. The VLR record timestamps are normalized at 208. The timestamps are normalized to have a common time zone, with year information, and to account for variations due to daylight savings time. The subscriber ID (MSISDN/MDN/IMSI, etc.) is compared to identify a duplicate VLR at 210. The timestamp of the VLR records is compared to identify an active VLR when duplicate VLR records exist in different MSSs/MSCs at 212.

The home subscriber is filtered based on subscriber ID such as MSISDN/MDN/IMSI etc.

For home subscribers, the VLR's GTA of the HLR record is updated from the HLR and old VLR records are removed from the MSS/MSC at 214. Non-active VLR records are deleted when duplicated VLR records exist. The server sends commands to each MSS or MSC, as well as home subscriber's HLR simultaneously based on the subscriber identities associated with suspect VLR records to delete the non-active VLR records and to update the VLR GTA in HLR when needed.

For non-home subscribers, non-active VLR records are removed from the MSS/MSC at 214 when duplicated VLR records exist. The server 24 (FIG. 2) sends commands to each MSS or MSC simultaneously based on the subscriber identities associated with suspect VLR records to delete the non-active VLR records.

The VLR's GTA in the home HLR is updated or corrected by comparing the HLR's GTA in use to the GTA of active VLR when duplicate VLR records exist. The server 24 (FIG. 2) sends commands to the HLR 32 based on the subscriber identity (IMSI, or MSISDN, or MDN) of each subscriber which has duplicate VLR record, to obtain HLR data from the home HLR including the subscriber VLR's GTA from HLR. The HLR data is stored in the database. The server 24 (FIG. 2) compares the VLR's GTA obtained from HLR with the GTA of the active VLR. If a difference is found, the Central Server/Computer 24 (FIG. 2) generates commands based on the subscriber identity to send to the HLR to update the recorded VLR GTA for the subscriber in the HLR to the GTA of the active VLR. The VLR GTA correction for an HLR applies to the Home HLR which is under control of the service provider or operator. The VLR GTA correction in the HLR will be skipped when the HLR is a foreign HLR which is under the control of another service provider or operator.

The process of reviewing suspect VLR records is continued at step 216 until all suspect subscribers with duplicate VLR records have been processed. Once the process has been completed, the transferred VLR files stored in the server may be deleted at 218. A report and statistics file may be generated at 220. Once those steps are complete, the method terminates at 222.

Figure 5:
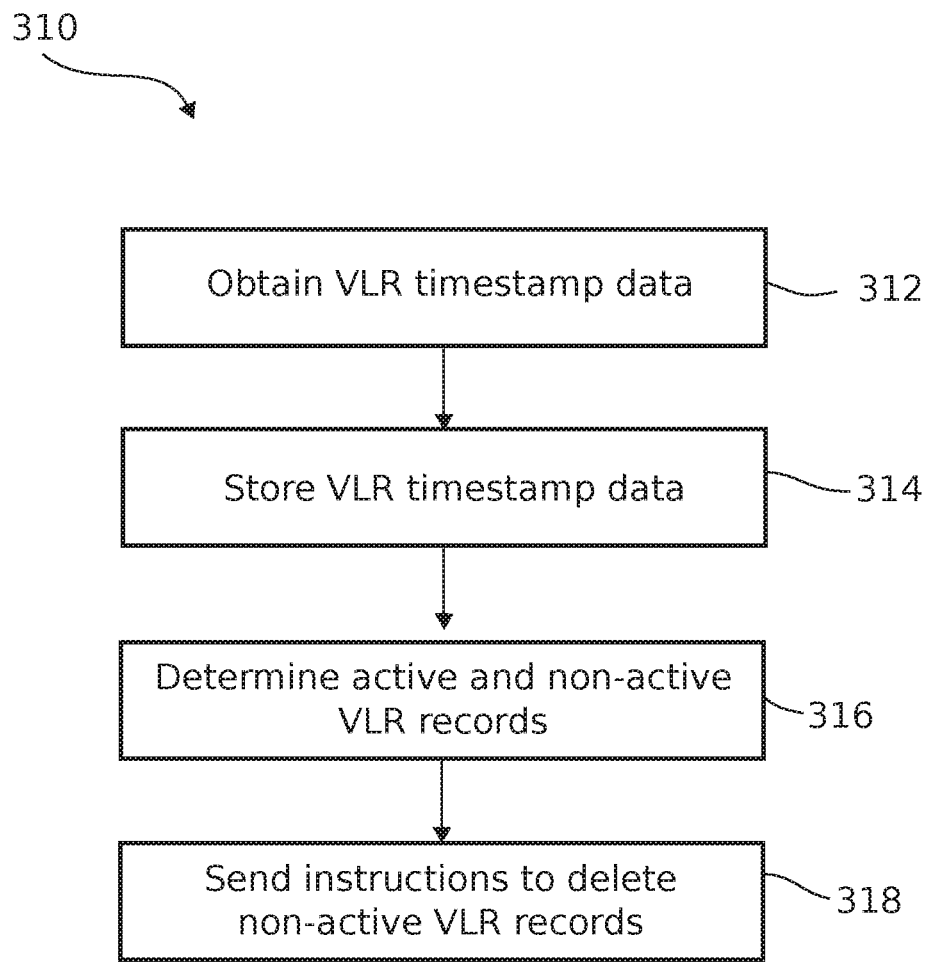
FIG. 5 is a flow diagram of an embodiment of a method of managing a plurality of VLRs in a telecommunication system.

FIG. 5 shows an embodiment of a method 310 of managing non-active VLR records that is similar to the method disclosed in FIG. 1, except that the subset of suspect VLR entries may be obtained by various methods other than doing a massive review of all subscriber identities. The suspect VLR entries may be obtained by conducting a review of multiple instances of a subscriber identity across multiple VLRs, as set out in FIGS. 1 and 3, but also may be obtained by being derived from a list of subscriber identities associated with users having network connectivity issues. In the latter case, the subset of subscriber identities may be VLR entries that are suspected as being duplicative due to connectivity issues which may become apparent, for example, because of error messages generated by the network or due to customer complaints. The method set out in FIG. 5 provides a way to determine whether duplicative VLR records exist by reviewing timestamp information from a subset of subscriber identities that are to be reviewed.

At 312, VLR timestamp data associated with a subset of the plurality of subscriber identities is obtained from the plurality of VLRs. The VLR timestamp data includes timestamp information from the plurality of VLRs corresponding to each subscriber identity of the subset of the plurality of subscriber identities. At 314, the VLR timestamp data is stored in the database. The VLR timestamp data is preferably obtained from the plurality of VLRs based on simultaneous requests sent to each of the plurality of VLRs for timestamp information from the VLR records that correspond the subscriber identities from the subset of subscriber identities. As discussed in FIG. 4, the timestamp information in the VLR timestamp data may be normalized into a common reference time prior to determining the active and the one or more non-active VLR records.

At 316, for each subscriber identity of the subset of subscriber identities, an active VLR record and one or more non-active VLR records is determined based on the VLR timestamp data.

At 318, instructions are sent to each of the VLR records storing non-active VLR records to delete the one or more non-active VLR records associated with each subscriber identity of the subset of subscriber identities.

Immaterial modifications may be made to the embodiments described here without departing from what is covered by the claims. For example, each of the processor, database or server or other systems disclosed may be physical, virtual or cloud-based systems so long as each can implement the methods disclosed. In those cases where the systems are physical, the functionality described for each of the processor, database or server or other systems may be implemented by a single piece of hardware at a specific location or may make use of multiple systems at separate locations. The processor, database and server themselves may be provided together on a single piece of hardware or multiple pieces of hardware. The processor may be of any configuration so long as it is able to carry out the method disclosed. The database may be any storage medium that can hold accessible data as described in the method disclosed. The network systems described may be entirely digital or analog or a mixture of the two so long as the necessary connections may be made between devices. The server may be any computing device, or virtual machine, or combinations thereof, that allows for the ability to store and analyze the data required to implement one or more of the methods described herein.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A method of managing a plurality of Visitor Location Registers (VLRs) in a telecommunication system, each of the plurality of VLRs having VLR records, each of the VLR records being associated with a subscriber identity of a plurality of subscriber identities, the method comprising:
   obtaining VLR subscriber data from the plurality of VLRs, the obtained VLR subscriber data including a list of subscriber identities obtained from the VLR records of the plurality of VLRs;
   identifying suspect VLR records from the obtained VLR subscriber data by identifying instances in which one or more of the subscriber identities is associated with more than one record in the plurality of VLRs;
   obtaining VLR timestamp data including timestamp information from the plurality of VLRs corresponding to each of the suspect VLR records;
   determining for each subscriber identity associated with the suspect VLR records an active VLR record and one or more non-active VLR records associated with the subscriber identity based on the obtained VLR timestamp data; and
   sending instructions to one or more VLRs or a Home Location Register (HLR) to update records associated with the one or more non-active VLR records for at least one subscriber identity.

2. The method of claim 1 further comprising converting the timestamp information for each of the suspect VLR records into a common reference time.

3. The method of claim 1 in which each of the subscriber identities comprise one of International Mobile Subscriber Identity (IMSI), Mobile Station International Subscriber Directory Number (MSISDN) or Mobile Directory Number (MDN).

4. The method of claim 1, further comprising:
   obtaining HLR data associated with subscriber identities corresponding with the suspect VLRs from one or more HLRs having HLR records, and in which each of the HLR records in the HLR is associated with one of the plurality of subscriber identities and a corresponding VLR Global Title Address (GTA) associated with the subscriber identity, the HLR data includes the VLR GTA associated with subscriber identities corresponding with the suspect VLRs;
   comparing the VLR GTA in the HLR records associated with each subscriber identity of the suspect VLR records with the VLR associated with the active VLR record; and
   sending instructions to update the HLR records in a home subscriber's HLR, for each of the subscriber identities associated with the suspect VLR records, to update the VLR GTA to point to the VLR associated with the active VLR record if the VLR GTA for the subscriber identity in the HLR is not the active VLR record.

5. The method of claim 1 further comprising sending instructions to the VLRs having non-active VLR records to delete the one or more non-active VLR records for each subscriber identity.

6. A system for managing a plurality of Visitor Location Registers (VLRs) in a telecommunication system, each of the plurality of VLRs having VLR records, each of the VLR records associated with a subscriber identity of a plurality of subscriber identities, the system comprising:
a server including a processor and a database, the server being configured to:
obtain VLR subscriber data from the plurality of VLRs, the obtained VLR subscriber data including a list of subscriber identities obtained from the VLR records of the plurality of VLRs;
store the VLR subscriber data in the database;
identify suspect VLR records from the obtained VLR subscriber data by identifying instances in which one or more of the subscriber identities is associated with more than one record in the plurality of VLRs;
obtain VLR timestamp data including timestamp information from the plurality of VLRs corresponding to each of the suspect VLR records;
determine for each subscriber identity associated with the suspect VLR records an active VLR record and one or more non-active VLR records associated with the subscriber identity based on the obtained VLR timestamp data; and
send instructions to one or more VLRs or a Home Location Register (HLR) to update records associated with the one or more non-active VLR records for at least one subscriber identity.

7. The system of claim 6 in which the server is further configured to convert the timestamp information for each of the suspect VLR records into a common reference time.

8. The system of claim 6 in which each of the subscriber identities comprise one of International Mobile Subscriber Identity (IMSI), Mobile Station International Subscriber Directory Number (MSISDN) or Mobile Directory Number (MDN).

9. The system of claim 6 in which the server is further configured to:
obtain HLR data associated with the subscriber identities corresponding with suspect VLR records from one or more HLRs having HLR records and in which each of the HLR records in the HLR is associated with one of the plurality of subscriber identities and a corresponding VLR GTA associated with the subscriber identity, the HLR data includes the VLR GTA associated with subscriber identities corresponding with the suspect VLR records;
store the HLR data in the database;
compare the VLR GTA in the HLR records associated with each subscriber identity of the suspect VLR records with the VLR associated with the active VLR record; and
send instructions to update, for each of the subscriber identities associated with the suspect VLR records, the home subscriber's HLR to update the VLR GTA to point to the VLR associated with the active VLR record if the VLR GTA for the subscriber identity in the HLR does not point to the VLR associated with the active VLR record.

10. The system of claim 6 further comprising the server being configured to send instructions to the VLRs having non-active VLR records to delete the one or more non-active VLR records for each subscriber identity.

11. A method of managing non-active Visitor Location Register (VLR) records from a plurality of VLRs in a telecommunication system, each of the plurality of VLRs having VLR records, each of the VLR records being associated with a subscriber identity of a plurality of subscriber identities, the method comprising:
obtaining VLR timestamp data associated with a subset of the plurality of subscriber identities from the plurality of VLRs, the VLR timestamp data including timestamp information from the plurality of VLRs corresponding to each subscriber identity of the subset of the plurality of subscriber identities;
determining, for each subscriber identity of the subset of subscriber identities, an active VLR record and one or more non-active VLR records based on the VLR timestamp data; and
sending instructions to one or more VLRs or a Home Location Register (HLR) to update records associated with the one or more non-active VLR records associated with at least one subscriber identity of the subset of subscriber identities.

12. The method of claim 11 in which the subset of subscriber identities is derived from a list of subscriber identities associated with users having network connectivity issues.

13. The method of claim 11 in which the subset of subscriber identities is obtained by obtaining VLR subscriber data from the plurality of VLRs, the VLR subscriber data including a list of subscriber identities obtained from the VLR records of the plurality of VLRs and the subset of subscriber identities is obtained from the obtained VLR subscriber data by identifying instances in which one or more of the subscriber identities is associated with more than one record in the plurality of VLRs.

14. The method of claim 11 in which the VLR timestamp data is obtained from the plurality of VLRs based on simultaneous requests sent to each of the plurality of VLRs for timestamp information from the VLR records corresponding to each subscriber identity of the subset of the plurality of subscriber identities.

15. The method of claim 11 further comprising converting the timestamp information in the VLR timestamp data into a common reference time prior to determining the active and the one or more non-active VLR records.

16. The method of claim 11 in which each of the subscriber identities comprise one of International Mobile Subscriber Identity (IMSI), Mobile Station International Subscriber Directory Number (MSISDN) or Mobile Directory Number (MDN).

17. The method of claim 11, further comprising:
obtaining HLR data associated with the subset of subscriber identities from one or more HLRs having HLR records, and in which the HLR records have a corresponding VLR Global Title Address (GTA) associated with each of the subscriber identities of the subset of subscriber identities, the HLR data includes the VLR GTA associated with subscriber identities of the subset of subscriber identities;
comparing the VLR GTA for each of the subscriber identities of the subset of subscriber identities with the VLR associated with the active VLR record; and
sending instructions, for each subscriber identity of the subset of subscriber identities associated with the one or more non-active VLR records, to a home subscriber's HLR to update the VLR GTA to point to the VLR associated with the active VLR record for the subscriber identity if the VLR GTA for the subscriber identity in the HLR data is associated with a VLR record identified as non-active.

18. A system for managing non-active Visitor Location Register (VLR) records from a plurality of VLRs in a telecommunication system, each of the plurality of VLRs having VLR records, each of the VLR records being associated with a subscriber identity of a plurality of subscriber identities, the system comprising:

a server including a processor and a database, the server being configured to:

obtain VLR timestamp data associated with a subset of the plurality of subscriber identities from the plurality of VLRs, the VLR timestamp data including timestamp information from the plurality of VLRs corresponding to each subscriber identity of the subset of the plurality of subscriber identities;

store the VLR timestamp data in the database;

determine, for each subscriber identity of the subset of subscriber identities, active and non-active VLR records based on the VLR timestamp data; and send instructions to one or more VLRs or a Home Location Register to update records associated with the non-active VLR records associated with least one subscriber identity of the subset of subscriber identities.

19. The system of claim 18 in which the server is further configured to:

obtain VLR subscriber data from the plurality of VLRs, the VLR subscriber data including a list of subscriber identities obtained from the VLR records of the plurality of VLRs;

store the VLR subscriber data in the database; and identify the subset of subscriber identities from the obtained VLR subscriber data by identifying instances in which one or more of the subscriber identities is associated with more than one record in the plurality of VLRs.

20. The system of claim 18 in which the server is further configured to convert the timestamp information from the VLR timestamp data into a common reference time.

21. The system of claim 18 in which each of the subscriber identities comprise one of International Mobile Subscriber Identity (IMSI), Mobile Station International Subscriber Directory Number (MSISDN) or Mobile Directory Number (MDN).

22. The system of claim 18 in which the server is further configured to:

obtain HLR data associated with the subset of subscriber identities from one or more HLRs having HLR records and in which the HLR records have a corresponding VLR Global Title Address (GTA) associated with each of the subscriber identities of the subset of subscriber identities, the HLR data includes the VLR GTA associated with each subscriber identity of the subset of subscriber identities;

store the HLR data in the database;

compare the VLR GTA for each of the subscriber identities of the subset of subscriber identities with the VLR associated with the active VLR record; and send instructions to a home subscriber's HLR, for each subscriber identity of the subset of subscriber identities associated with non-active VLR records, to update the VLR GTA to point to the VLR associated with the active VLR record for the subscriber identity if the VLR GTA for the subscriber identity in the HLR data does not point to the VLR associated with the active VLR record.

23. The system of claim 18 further comprising the server being configured to send instructions to each of the plurality of VLRs storing non-active VLR records to delete the non-active VLR records associated with each subscriber identity of the subset of subscriber identities.

24. The method of claim 5 in which each of the VLRs are stored at one of a Mobile Switching Station (MSS) and a Mobile Switching Center (MSC), and in which sending instructions to delete the one or more non-active VLR records for each subscriber identity further comprises sending instructions to each of the MSSs or MSCs simultaneously.

25. The system of claim 10 in which each of the VLRs are stored at one of a Mobile Switching Station (MSS) and a Mobile Switching Center (MSC), and in which the server is configured to send instructions to each of the MSSs or MSCs simultaneously when the server sends instructions to delete the one or more non-active VLR records.

26. The method of claim 11 further comprising sending instructions to each of the VLR records storing non-active VLR records to delete the one or more non-active VLR records associated with each subscriber identity of the subset of subscriber identities.

27. The system of claim 23 in which each of the VLRs are stored at one of a Mobile Switching Station (MSS) and a Mobile Switching Center (MSC), and in which the server is configured to send instructions to each of the MSSs or MSCs simultaneously when the server sends instructions to delete the one or more non-active VLR records.

* * * * *